United States Patent [19]

Higuchi

[11] Patent Number: 4,676,072
[45] Date of Patent: Jun. 30, 1987

[54] BYPASS SYSTEM FOR A DUAL REFRIGERATION CYCLE AIR CONDITIONER

[75] Inventor: Itsuo Higuchi, Fuji, Japan

[73] Assignee: Kabushiki Kaisha Toshiba, Kawasaki, Japan

[21] Appl. No.: 760,985

[22] Filed: Jul. 31, 1985

[30] Foreign Application Priority Data

Oct. 26, 1984 [JP] Japan .......................... 59-161106[U]

[51] Int. Cl.$^4$ .......................... F25B 7/00; F25B 41/00
[52] U.S. Cl. ........................................ 62/175; 62/197; 62/228.4
[58] Field of Search ............. 62/175, 197, 510, 228.4, 62/228.5, DIG. 17

[56] References Cited

U.S. PATENT DOCUMENTS

| | | | |
|---|---|---|---|
| 2,454,263 | 11/1948 | Newton | 62/197 X |
| 3,243,970 | 4/1966 | Lippincott | 62/197 |
| 3,313,121 | 4/1967 | Barbier | 62/197 |
| 4,258,553 | 3/1981 | Kelly et al. | 62/197 X |
| 4,462,219 | 7/1984 | Iwata | 62/DIG. 17 |

FOREIGN PATENT DOCUMENTS

| | | |
|---|---|---|
| 49495 | 11/1980 | Japan . |
| 2133521 | 7/1984 | United Kingdom . |
| 2134237 | 8/1984 | United Kingdom . |

*Primary Examiner*—Harry Tanner
*Attorney, Agent, or Firm*—Cushman, Darby and Cushman

[57] ABSTRACT

An air conditioner includes a first refrigeration cycle with a capacity-variable type compressor, and a second refrigeration cycle with a constant rotation type compressor, both refrigeration cycles having outdoor heat exchangers while utilizing a single common indoor heat exchanger. The first refrigeration cycle has a bypass passage connected, at one end, between the suction side of the compressor and the indoor heat exchanger, and, at the other end, between the indoor heat exchanger and the outdoor heat exchanger. When the second refrigeration cycle is stopped, or the capacity variable compressor operated at a low operation frequency, a part of the coolant which passes through the outdoor heat exchanger in the first refrigeration cycle flows into the suction side of the compressor through the bypass passage.

8 Claims, 4 Drawing Figures

BYPASS SYSTEM FOR A DUAL REFRIGERATION CYCLE AIR CONDITIONER

BACKGROUND OF THE INVENTION

This invention relates to an air conditioner, and, in particular, to an air conditioner having a first refrigeration cycle involving a capacity-variable type compressor, and a second refrigeration cycle involving a constant rotation type compressor.

An air conditioner having two refrigeration cycles independent of each other is known. The compressor included in a first refrigeration cycle is comprised of a capacity-variable type compressor whose operating frequency is controlled by an inverter etc., to permit the number of rotations per unit time to vary in a stepless fashion. The compressor included in a second refrigeration cycle is comprised of a constant rotation type compressor which is normally operated with a constant number of rotations. The first and second refrigeration cycles each have an outdoor heat exchanger, but they never have their own indoor heat exchangers, i.e., they have a single common indoor heat exchanger. These refrigeration cycles permit a cooling operation as well as a heating operation.

The operation of the above-mentioned air conditioner is controlled by continuously varying the operating frequency of the compressor in the first refrigeration cycle in accordance with a difference between a temperature ($T_a$) measured by a room temperature sensor in the indoor unit and a set temperature ($T_b$). A control also exists to stop the operation of the second refrigeration cycle when the difference temperature ($T_a - T_b$) reaches a constant level. Even after the operation of the second cooling cycle is stopped, the operating frequency of the compressor in the first refrigeration cycle is variably controlled in accordance with the difference temperature ($T_a - T_b$).

In an air conditioner of this type, however, a single common indoor heat exchanger is, as described above, shared by the first and second refrigeration cycles. Thus, when the operation of only the first refrigeration cycle is performed, with the operation of the second refrigeration cycle stopped, the evaporation rate of a coolant in the first refrigeration cycle will, at the indoor heat exchanger, be about two times as great as in the case where both refrigeration cycles are operated. As a result, the evaporation pressure of the coolant is raised, resulting in an overheating cycle. In this case, the suction pressure of the compressor exceeds its allowable pressure, causing damage to the compressor, all of which poses the problem of reducing the reliability of the air conditioner. This phenomenon occurs prevalently in the case where the operating frequency of the compressor, in particular, is low.

If, under the operating conditions of the first and second refrigeration cycles, the operation of the second refrigeration cycle is stopped, a capacity gap occurs in the air conditioner between the times before and after the stopping of the operation of the second refrigeration cycle, thus presenting an obstacle to fine control of the air conditioner in accordance with a load.

SUMMARY OF THE INVENTION

It is, accordingly, the object of this invention to provide an air conditioner of high reliability which includes a first refrigeration cycle having a capacity-variable type compressor, and a second refrigeration cycle having a constant-rotation type compressor, the first and second refrigeration cycles sharing a single common indoor heat exchanger, which can prevent both overheating and excessive increases in the suction pressure of the compressor in the first refrigeration cycle when the operation of the second refrigeration cycle is stopped, in addition to reducing a capacity gap between the times before and after the second refrigeration cycle is stopped.

In order to achieve the above-mentioned object there is provided an air conditioner which comprises a first refrigeration cycle including a capacity-variable type compressor, a first outdoor heat exchanger connected to one side of the compressor, an indoor heat exchanger connected to the other side of the compressor, an expansion means connected between the first outdoor heat exchanger and the indoor heat exchanger, a bypass passage connected, at one end, between said one side of the compressor and the indoor heat exchanger, and, at the other end, between the first outdoor heat exchanger and the indoor heat exchanger, a control valve disposed in the bypass passage, and a control unit for opening and closing the control valve in accordance with a load of the air conditioner, wherein, when the control valve is opened, part of the coolant which passes through the first outdoor heat exchanger flows into said one side of the compressor through the bypass passage; and a second refrigeration cycle including a constant rotation type compressor, a second outdoor heat exchanger connected to one side of the constant rotation type compressor, the other side of constant rotation type compressor being connected to said indoor heat exchanger, and a decompressor connected between the second outdoor heat exchanger and the indoor heat exchanger.

DETAILED DESCRIPTION OF THE PREFERRED EMBODIMENTS

Embodiments of this invention will now be described in detail with reference to the accompanying drawings.

Figure 1:
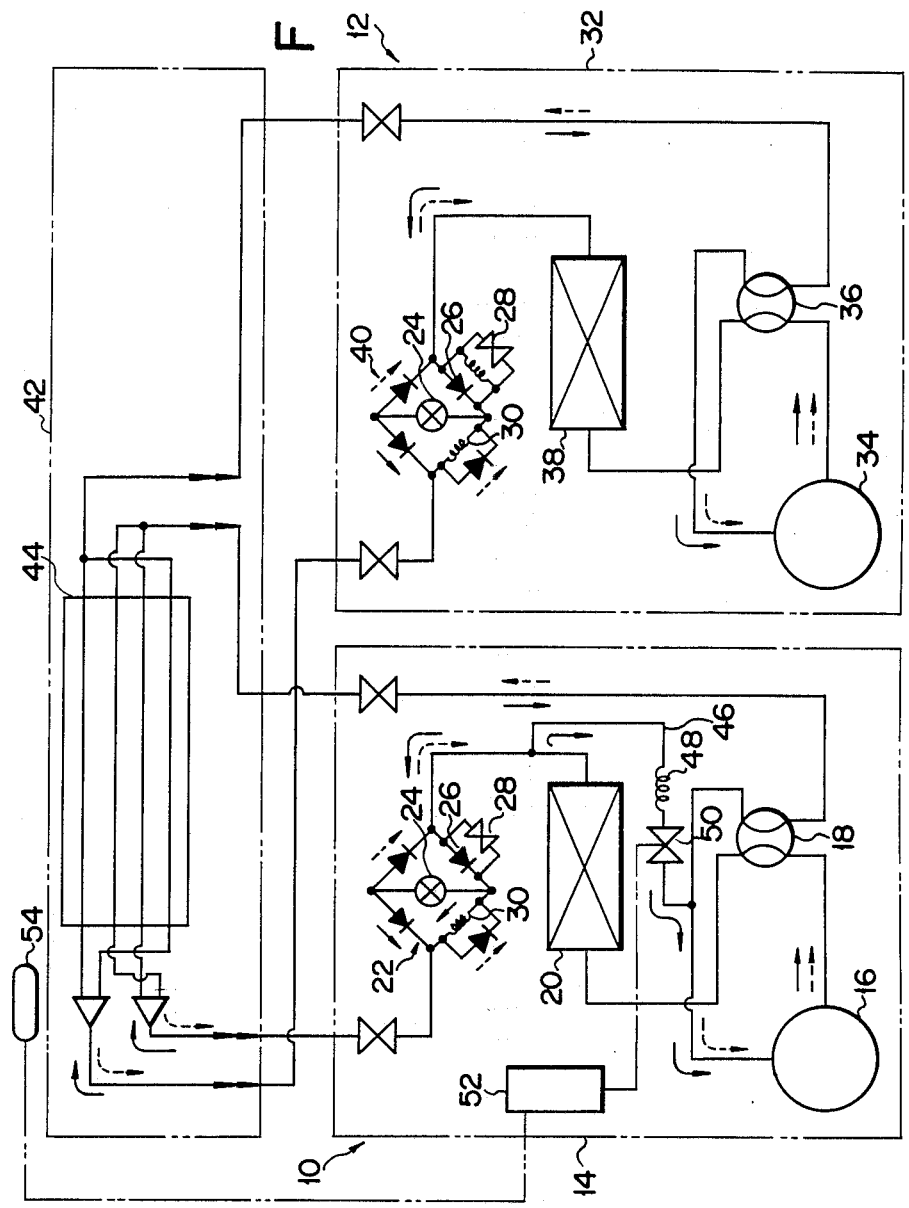
FIG. 1 is a circuit diagram showing a coolant pipe system of an air conditioner according to one embodiment of the present invention.

FIG. 1 shows a coolant pipe system of an air conditioner according to one embodiment of this invention. As shown in FIG. 1, the air conditioner has first and second refrigeration cycles 10 and 12 which are independent of each other. In an outdoor unit 14 of the first refrigeration cycle 10, a capacity-variable type compressor 16 is provided. The compressor 16 is variably controlled in its operating frequency by an inverter etc., to permit the number of its rotations to vary in a stepless fashion. A four-way valve 18 is connected to the discharge and suction sides of the compressor 16, and a first outdoor heat exchanger 20 is connected, at one end, to one end of the four-way valve 18, and, at the other end, to a bridge circuit 22 as a decompressor. The bridge circuit 22 is mainly comprised of an expansion valve 24, a check valve 26, a two-way valve 28 connected in parallel with the check valve, and a capillary tube 30 for cooling.

In an outdoor unit 32 of the second refrigeration cycle 12 is provided a constant rotation type compressor 34 which is normally rotated over a constant number of rotations. The other arrangement of the second refrigeration cycle 12, including a four-way valve 36, second outdoor heat exchanger 38 and bridge circuit 40, is provided in a way similar to that of the first refrigeration cycle.

An indoor heat exchanger 44 is provided in an indoor unit 42 for the first and second refrigeration cycles 10 and 12. The heat exchanger 44 serves as a common heat exchanger for both the indoor heat exchangers of the first and second refrigeration cycles. The bridge circuits 22 and 40 of the first and second refrigeration cycles, respectively, are connected to one side of the indoor heat exchanger 44, and the four-way valves 18 and 36 of the first and second refrigeration cycles, respectively, are connected to the other side of the indoor heat exchanger. In consequence, the coolant of the first and second cooling cycles 10 and 12 flows through the indoor heat exchanger 44 in a parallel-flow fashion.

The above-mentioned arrangement of the air conditioner is the same as that of the conventional air conditioner, but the following advantages can be obtained from the following novel arrangement according to this invention. As shown in FIG. 1, the first refrigeration cycle 10 includes a bypass passage 46 for permitting part of the coolant, which is condensed by the first heat exchanger 20, to be returned to the suction side of the compressor 16 when the capacity-variable type compressor 16 is operated at a low frequency during the cooling operation. One end of the bypass passage 46 is connected between the suction side of the compressor 16 and the four-way valve 18, and the other end thereof is connected between the first heat exchanger 20 and the bridge circuit 22. A capillary tube 48 and a two-way valve 50 for bypassing are provided in the bypass passage 46. A control unit 52 is connected to the two-way valve 50 to control the opening and closing of the two-way valve. The control unit 52 includes a room temperature sensor 54 for detecting the temperature within the room where the indoor heat exchanger 44 is located. Instead of the room temperature sensor 54, the control unit 52 may have a rotation number sensor for detecting the number of rotations of the compressor 16.

The operation of the air conditioner having the above construction will now be described.

In FIG. 1, the arrows, as indicated by the solid and broken lines, represent the direction of the flow of the coolant during the cooling and heating operations, respectively. The heating and cooling modes of operation are switched by switching the four-way valves 18 and 36.

The flow of the coolant in the cooling operation will now be explained.

When the compressor 16 is driven, a coolant of a high-temperature and high-pressure level, which is obtained by compression at the compressor, is delivered from its discharge port to the four-way valve 18. In the cooling operation, the four-way valve 18 is set to the cooling position shown, while in the heating operation the four-way valve is switched to permit a change in the connection system of the refrigeration cycle 10. The coolant passing through the four-way valve 18 flows into the first outdoor heat exchanger 20, as indicated by the solid-line arrow in FIG. 1, where, while radiating heat, it is condensed. The condensed coolant flows into the bridge circuit 22 where the coolant flows in two-flow modes. That is, the coolant flowing through the check valve 26, which is in paralled with the two-way valve 28, is branched one into the expansion valve 24 and one into the capillary tube 30 for cooling. The heat expanded coolant flows into the indoor heat exchanger 44 where the coolant is, while absorbing the ambient heat, evaporated and then returned into the compressor 16 through the four-way valve 18, terminating one cycle of the first refrigeration cycle.

In the second refrigeration cycle 12, a coolant discharged from the compressor 34 at both a high-temperature and a high-pressure level is sent through the four-way valve 36, second outdoor heat exchanger 38 and bridge circuit 40 into the indoor heat exchanger 44, and returned from there through the four-way valve 36 into the compressor 34 as in the first refrigeration cycle. In the heating operation, the four-way valves 18 and 36 are switched to a heating mode position to permit the coolant to flow in the direction indicated by the broken-line arrows in FIG. 1.

Consideration will now be given to the arrangement of the conventional air conditioner without the bypass passage 46 of this embodiment.

In the cooling operation where the operation of the second refrigeration cycle 12 is stopped, the evaporation of the coolant in the second cooling cycle 12 is stopped in the indoor heat exchanger 44. For this reason, only the coolant in the first refrigeration cycle 10 is heat-exchanged, or evaporated in the indoor heat exchanger 44. In consequence, the evaporation efficiency of the coolant in the first refrigeration cycle 10 is enhanced in the indoor heat exchanger 44, as compared with the case where the operations of both the first and second refrigeration cycles are operated, resulting in a rise in the evaporation temperature and pressure of the coolant. For this reason, cases sometimes occur wherein the suction pressure of the compressor 16 exceeds its allowable pressure. This tendency is prevalent at the lower operating frequency of the compressor 16.

According to this embodiment, the above problem can be eliminated through the provision of the bypass passage 46. That is, when the two-way valve 50 for bypassing is opened with the operation of the second refrigeration cycle stopped, and the compressor 16 operated at a low frequency, part of the coolant which passes through the first outdoor heat exchanger 20 flows into the bypass passage 46. This coolant is adiabatically expanded by the capillary tube 48 into one of a low temperature level and then returned to the suction side of the compressor 16. The low temperature coolant is mixed, at the suction side of the compressor 16, with the high-temperature and high-pressure level coolant from the indoor heat exchanger 44, thereby preventing a rise in the suction pressure, as well as a possible overheating. The opening of the two-way valve 50 causes a reduction in the amount of coolant flowing into the indoor heat exchanger 44, and a consequent lowering in the cooling capacity of the air conditioner. The opening and closing of the two-way valve 50 for bypassing are controlled by the control device 52 in accordance with a difference between the initially set temperature and the room temperature, or with the number of rotations of the capacity-variable type compressor 16.

Figure 2:
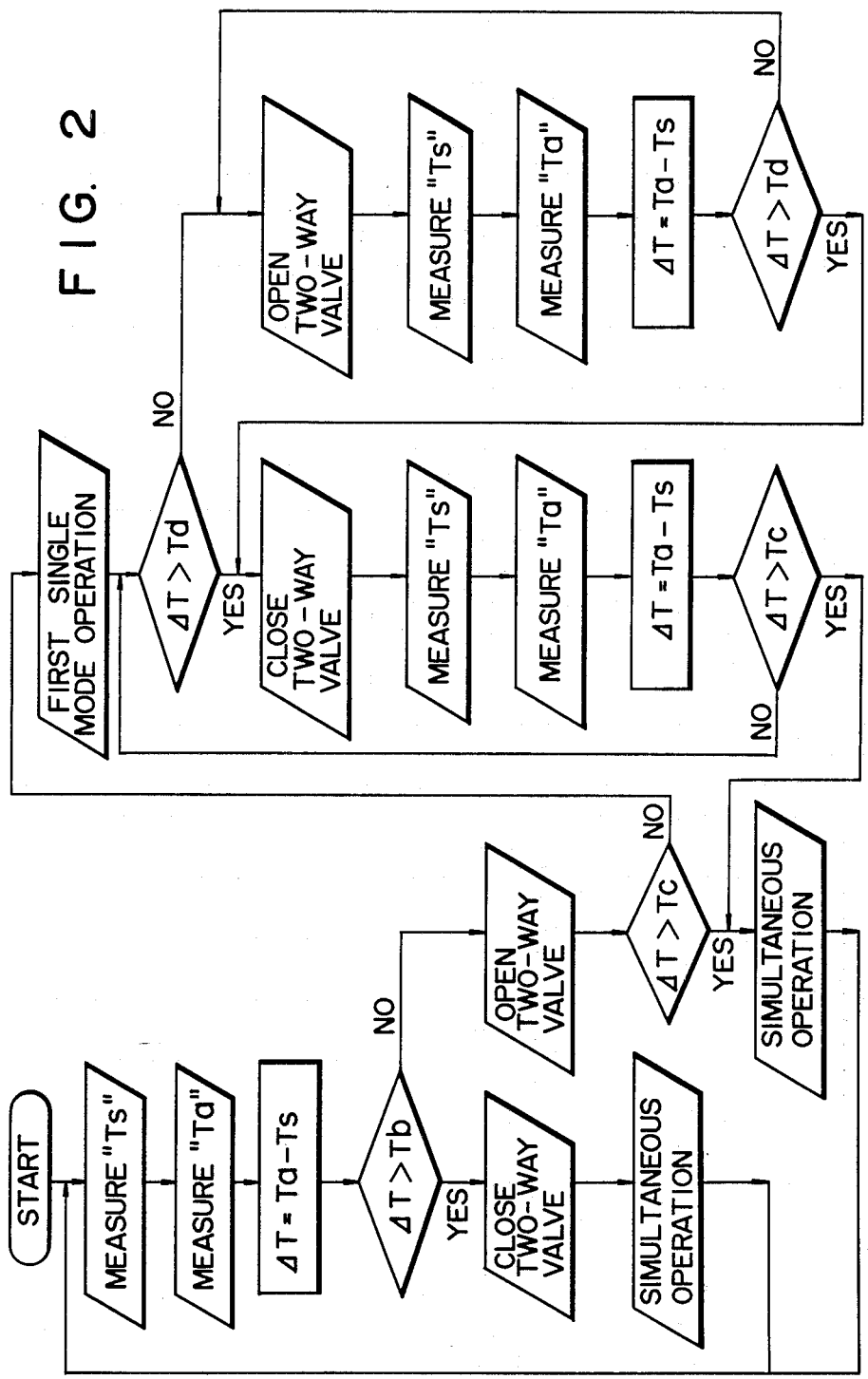
FIG. 2 is a flow chart showing the control operation of the conditioner.

The controlling operation of the air conditioner will now be described on the basis of a flow chart in FIG. 2.

When the operation of the air conditioner is started, the control unit 52 measures the set temperature $T_S$ given initially and room temperature $T_a$ in the room with the indoor heat exchange 44, the temperature $T_a$ being detected by the room temperature sensor 54. The control unit 52 compares the temperature difference $$\Delta T = T_a - T_s$$

with a bypass set temperature $T_b$ to see whether $$\Delta T > T_b$$

through computation. If the answer is in the affirmative, then the control unit 52 closes the two-way valve 50 so as to permit the operation of the air conditioner to be performed with a 100% capacity, and gives an instruction whereby the simultaneous operation of the first and second refrigeration cycles 10 and 12 is carried out. When the answer is in the negative, the control unit 52 opens the two-way valve 50 to reduce the cooling capacity of the air conditioner. Thereafter, the temperature difference $\Delta T$ is compared with a temperature $T_c$ at which the operation of the second refrigeration cycle is stopped. If $\Delta T > T_c$, then the control unit 52 permits the simultaneous operation of both the first and second refrigeration cycles 10 and 12 to be carried out with the two-way valve 50 opened. At $\Delta T < T_c$, the control unit 52 stops the operation of the second refrigeration cycl, and, thus, the first refrigeration cycle 10 is operated as a single mode of operation. After such single mode of operation, the control unit 52 compares the temperature difference $\Delta T$ with a temperature $T_d$ at which the two-way valve 50 is opened in the single mode of operation of the first refrigeration cycle. At $\Delta T > T_d$, the control unit 52 closes the two-way valve 50 while, in contrast, at $\Delta T < T_d$, the control unit opens the two-way valve 50. In this connection it is to be noted that the levels of the temperatures $T_b$, $T_c$ and $T_d$ have the following relation:

$$T_b > T_c > T_d$$

In this way, as the room temperature approaches the set temperature after the operation of the air conditioner has begun, the cooling capacity of the air conditioner is lowered in a steped fashion. If the temperature difference between the room temperature and the set temperature increases due to a rise in room temperature, the refrigeration capacity of the air conditioner is raised by opening and closing the two-way valve 50 in the stepped fashion.

Figure 3:
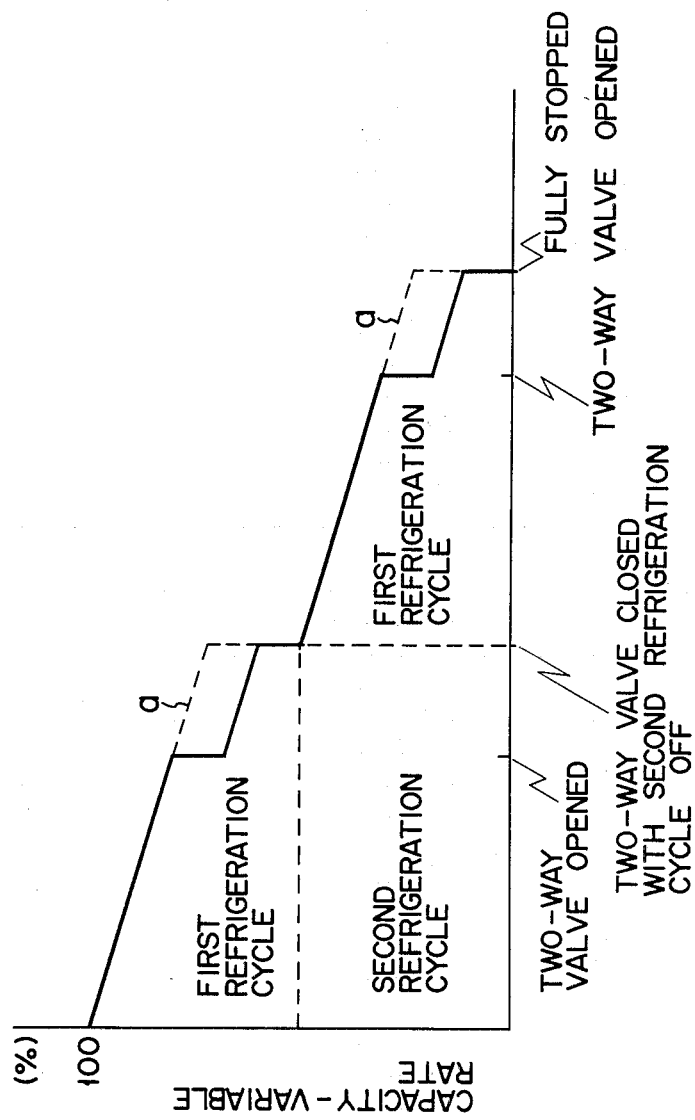
FIG. 3 is a characteristic diagram showing a variation in capacity of the air conditioner.

FIG. 3 shows a variation of the capacity of the air conditioner under the above-mentioned operation control. As seen from FIG. 3, the opening of the two-way valve 50 permits the cooling capacity of the air conditioner to be lowered. If the two-way valve 50 is opened to reduce the cooling capacity of the air conditioner by one step before the operation of the second refrigeration cycle 12 stops, then, the capacity gap between the times before and after the stopping of the operation of the second refrigeration cycle 12 can be considerably lessened as compared with the capacity gap of the conventional air conditioner, as indicated by the broken lines a in FIG. 3. In consequence, the cooling capacity of the air conditioner can be varied in more linear a fashion, allowing fine control to be made in accordance with the load.

When the two-way valve 50 is opened, part of the coolant which passes through the first outdoor heat exchanger 20 is returned to the suction side of the compressor 16, through the bypass passage 46. For this reason, a rise in the suction pressure of the compressor 16, as well as the overheating of the compressor can be prevented by utilizing the control based on temperature difference between the set temperature and the room temperature, in combination with a control based on the number of rotations of the compressor 16, that is, by opening the two-way valve 50 during in the single mode of operation of the first refrigeration cycle 10 and, in particular, during the low frequency operation of the compressor 16. This control prevents damage to the compressor 16 and, in addition, enhances the reliability of the air conditioner.

Figure 4:
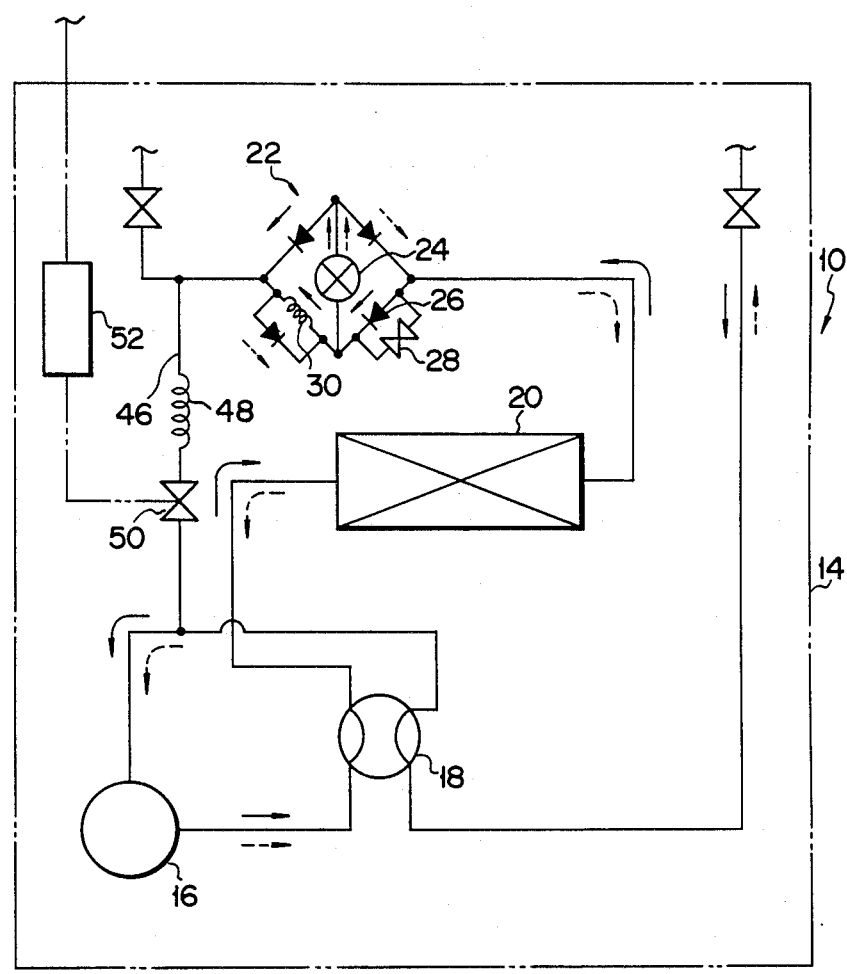
FIG. 4 is a circuit diagram showing a part of a coolant pipe system of an air conditioner according to another embodiment of this invention.

This invention is not limited to the embodiment described above, various changes and modifications may be effected therein by one skilled in the art without departing from the spirit or scope of this invention. For example, the connecting position is not restricted to the above-mentioned embodiment. The bypass passage has only to be located at the position where, in the cooling operation, part of the coolant bypasses the indoor heat exchanger, and, at the same time, the capacity-variable type compressor can be cooled. In other words, the bypass passage has only to be connected, at one end, to the location between the indoor heat exchanger and the suction side of the compressor, and, at the other end, to the location between the outdoor heat exchanger and the indoor heat exchanger. As shown in FIG. 4, for example, the bypass passge 46 may be connected, at one end, between the four-way valve 18 and the suction side of the compressor 16, and, at the other end, between the bridge circuit 22 and the indoor heat exchanger 44. Even in this embodiment it is possible to obtain the same functional advantage as in the first embodiment described above.

What is claimed is:

1. An air conditioner comprising:
    an indoor heat exchanger having first and second cooling passages;
    a first refrigeration cycle including a capacity-variable type compressor, a first outdoor heat exchanger connected to one side of the compressor and the first cooling passage of the indoor heat exchanger connected to the other side of the compressor, an expansion valve connected between the first outdoor heat exchanger and the first cooling passage of the indoor heat exchanger, a bypass passage connected at one end, between said one side of the compressor and the indoor heat exchanger, and, at the other end, between the first outdoor heat exchanger and the indoor heat exchanger, a control valve disposed in the bypass passage and control means for opening and closing the control valve in accordance with a load of the air conditioner, wherein, when the control valve is opened, part of the coolant which passes through the first cooling passage of the first outdoor heat exchanger flows into said one side of the compressor through the bypass passage; and
    a second refrigeration cycle including a constant rotation type compressor, a second outdoor heat exchanger connected to one side of the constant rotation type compressor, the other side of the constant rotation type compressor being connected to said indoor heat exchanger, and an expansion valve connected between the second outdoor heat exchanger and the indoor heat exchanger;

room temperature sensor means for detecting a temperature of the room in which said indoor heat exchanger is located, and for opening and closing the control valve in accordance with a temperature difference;

$$\Delta T = Ta - Ts$$

where

Ta is the room temperature detected by the room temperature sensor and

Ts is a set temperature wherein said control unit is also for, in a cooling operation of said air conditioner, comparing the temperature difference $\Delta T$ with a given temperature $T_b$ so that when $\Delta T < T_b$, the first and second cooling cycles are operated with the control valve opened, and for comparing the temperature difference $\Delta T$ with a given temperature $T_c$ where $T_c$ is less than $T_b$ so that when $\Delta T$ is less than $T_c$, the second refrigeration cycle is operated with the control valve closed.

2. An air conditioner according to claim 1, in which said control means is also for, during said cooling mode of operation of said air-conditioner, comparing said temperature difference $\Delta T$ with a given temperature $T_d$ ($T_d < T_c$), and for operating said first refrigeration cycle with said control valve opened when $\Delta T$ is less than $T_d$.

3. An air conditioner comprising:

an indoor heat exchanger, having first and second indoor heat exchanger coolant passages;

a first refrigeration cycle including a capacity-variable type compressor, a first outdoor heat exchanger connected to one side of the compressor, and the first indoor heat exchanger coolant passage connected to the other side of the compressor, expansion means connected between the first outdoor heat exchanger and the first indoor heat exchanger coolant passage, a bypass passage, connected at one end between the other side of the compressor and the first indoor heat exchanger coolant passage, and at the other end between the first outdoor heat exchanger and the first indoor heat exchanger coolant passage, and control valve means disposed in the bypass passage for opening and closing the bypass passage;

a second refrigeration cycle including a constant rotation type compressor, a second outdoor heat exchanger connected to one side of the constant rotation type compressor, and the second indoor heat exchanger coolant passage connected to the other side of the constant rotation type compressor, and expansion means connected between the second indoor and outdoor exchanger; and control means for opening and closing the control valve means and controlling the operation of the first and second refrigeration cycles, said control means including room temperature sensor means for detecting the temperature of the room in which said first and second indoor heat exchangers are located, wherein said control means is also for: (1) during a cooling operation of said air conditioner, comparing a temperature difference $\Delta T = Ta - Ts$ (where Ta: the room temperature detected by the room temperature sensor, Ts: a set temperature) with a given temperature $T_b$ so that when $\Delta T > T_b$, the first and second refrigeration cycles are operated with the control valve closed, and, when $\Delta T < T_b$, said first and second cooling cycles are operated with said control valve opened, and (2) comparing a temperature difference $\Delta T$ with a given temperature $T_c$, where $T_c$ is less than $T_b$, so that when $\Delta T$ is less than $T_c$, the second refrigeration cycle is stopped, while, at the same time, the first cooling cycle is operated with said control valve closed.

4. An air conditioner according to claim 3, in which said bypass passage is connected, at one end, between said one side of the capacity-variable type compressor and the indoor heat exchanger, and, at the other end, between the first outdoor heat exchanger and the expansion means.

5. An air conditioner according to claim 3, in which said bypass passage is connected, at one end, between said one side of the capacity-variable type compressor and the indoor heat exchanger, and, at the other end, between the expansion means of the first refrigeration cycle and the indoor heat exchanger.

6. An air conditioner according to claim 3, in which said bypass passage includes a capillary tube.

7. An air conditioner according to claim 3, in which said control unit includes rotation number sensor for detecting the number of rotations of said capacity-variable compressor to permit said control valve to be opened and closed in accordance with the number of rotations by said sensor.

8. An air conditioner according to claim 3, in which said control means is also for, during said cooling mode of operation of said air-conditioner, comparing said temperature difference $\Delta T$ with a given temperature $T_d$ ($T_d < T_c$), and for operating said first refrigeration cycle with said control valve opened when $\Delta T$ is less than $T_d$.

* * * * *